United States Patent
Badyal et al.

[11] Patent Number: 6,151,015
[45] Date of Patent: Nov. 21, 2000

[54] PEN LIKE COMPUTER POINTING DEVICE

[75] Inventors: Rajeev Badyal; Derek L. Knee, both of Ft. Collins, Colo.

[73] Assignee: Agilent Technologies, Palo Alto, Calif.

[21] Appl. No.: 09/067,280

[22] Filed: Apr. 27, 1998

[51] Int. Cl.[7] ..................................... G09G 5/00
[52] U.S. Cl. ...................... 345/179; 345/182; 345/180
[58] Field of Search .................... 345/179, 180, 345/181, 182, 183, 173, 175, 176, 158, 157, 156, 169; 178/18.1, 18.11, 19.02, 19.04, 19.05

[56] References Cited

U.S. PATENT DOCUMENTS

| | | | |
|---|---|---|---|
| 4,794,384 | 12/1988 | Jackson | 340/710 |
| 5,414,227 | 5/1995 | Schubert et al. | 178/18 |
| 5,477,012 | 12/1995 | Sekendur | 178/18 |
| 5,644,139 | 7/1997 | Allen et al. | 250/557 |

FOREIGN PATENT DOCUMENTS

| | | | |
|---|---|---|---|
| 0 362 970 A2 | 11/1986 | European Pat. Off. | G06K 9/22 |
| 0 703 544 A1 | 8/1995 | European Pat. Off. | G06K 11/18 |
| 07293783 | 10/1995 | Japan | G06F 3/033 |
| 2 272 763 | 11/1993 | United Kingdom | G06K 11/08 |

*Primary Examiner*—Xiao Wu
*Attorney, Agent, or Firm*—Alexander J. Neudeck

[57] ABSTRACT

A pen like computer pointing device images as an array of pixels the spatial features of generally any micro textured or micro detailed work surface below the tip of the pen. The photo detector responses are digitized and stored as a frame into memory. Motion produces successive frames of translated patterns of pixel information, which are compared by autocorrelation to ascertain the direction and amount of movement. A contact sensor senses when the tip of the pointing device is in contact with the work surface. Buttons are included on the body of the pointing device that allow it to function in place of a computer mouse device.

7 Claims, 1 Drawing Sheet

PEN LIKE COMPUTER POINTING DEVICE

REFERENCE TO RELATED PATENTS

This Application is related to the subject matter described in the following two U.S. patents: U.S. Pat. No. 5,578,813 filed Mar. 2, 1995, issued Nov. 26, 1996 and entitled FREEHAND IMAGE SCANNING DEVICE WHICH COMPENSATES FOR NONLINEAR MOVEMENT; and U.S. Pat. No. 5,644,139, filed Aug. 14, 1996, issued Jul. 1, 1997 and entitled NAVIGATION FOR DETECTING MOVEMENT OF NAVIGATION SENSORS RELATIVE TO AN OBJECT. Both of these Patents have the same inventors: Ross R. Allen, David Beard, Mark T. Smith and Barclay J. Tullis, and both patents are assigned to Hewlett-Packard Co. This application is also related to the subject matter described in U.S. Pat. No. 5,786,804 filed Oct. 6, 1995, entitled METHOD AND SYSTEM FOR TRACKING ATTITUDE, and U.S. patent application Ser. No. 09/052,046 filed Mar. 30, 1998, entitled SEEING EYE MOUSE FOR A COMPUTER SYSTEM, both assigned to Hewlett-Packard Co. These three patents describe techniques of tracking position movement and computer pointing devices. Those techniques are a component in the preferred embodiment described below. Accordingly, U.S. Pat. Nos. 5,578,813, 5,644,139, and 5,786,804 are hereby incorporated herein by reference. The related application describes a computer mouse based on those techniques, therefore U.S. patent application Ser. No. 09/052,046 filed Mar. 30, 1998, entitled SEEING EYE MOUSE FOR A COMPUTER SYSTEM is hereby incorporated herein by reference.

FIELD OF THE INVENTION

This invention relates generally to devices for controlling a cursor on a computer display screen, also known as computer pointing devices. This invention relates even more particularly to computer pointing devices that mimic the operation of a handheld writing utensil, such as a pen.

BACKGROUND OF THE INVENTION

The use of a hand operated pointing device for use with a computer and its display has become almost universal. By far the most popular of the various devices is the conventional (mechanical) mouse. More recently, portable computers have become available which incorporate pen based input devices. These computers use an electronic pen to write data on a display or to select data presented on the display. To use a pen based computer, the computer user holds the electronic pen and writes on the surface of the associated display. The electronics in the pen and computer compute the position of the pen relative to the display and perform the function requested by the user of the computer. The display on a pen based computer needs to be flat to enable the user to write on the display surface conveniently and requires a special type of display that can detect the position of the pen touching the surface of the display. Other types of pen and pen-like pointing devices, such a stylus, suffer a similar limitation: They must be used on a special surface such as a graphics tablet.

Limiting the use of a pen based pointing device to a special surface limits the usefulness of such a device. When the special surface is a display screen, that screen inconveniently needs to be laid flat to write in a conventional manner. When the special surface is a graphics tablet or similar device, that tablet needs to be hauled around with the computer. Furthermore, both of these devices limit to a small region the area upon which writing or pointing may be done and still be captured by the computer.

Accordingly, there is a need in the art for a reliable and intuitive way to perform pointing function for a desktop or a laptop computer that functions on almost any surface. It is desirable that this pointing device be capable of inputting freehand text and drawings in a pen-like manner without additional hardware. Finally, it is desirable that this device not have any cables or wires that may get tangled or otherwise interfere with the writing process connecting it to the computer.

SUMMARY OF THE INVENTION

A preferred embodiment of the invention is shaped like a writing pen. There are one or more buttons disposed on the outside of the device that may be used for functions similar to the buttons on a computer mouse. A preferred embodiment utilizes an infrared (IR) illumination source to illuminate the surface on which the device is used. One or more IR light emitting diodes (LED) may be used for this purpose. The surface image is focused onto an optical motion sensor integrated circuit that calculates the necessary information to indicate the motion of the tip of the device. This information, and the state of the buttons, is relayed to the computer via a wireless link.

The motion of the tip is detected optically by directly imaging, as an array of pixels, the various particular spatial features of a work surface below the tip, much as human vision is believed to do. In general, this work surface may be almost any flat surface; in particular, the work surface need not be a graphics tablet, or display, special or otherwise. To this end the work surface below the imaging mechanism is illuminated by the aforementioned infrared LED. A surprisingly wide variety of surfaces create a rich collection of highlights and shadows when illuminated with a suitable angle of incidence. That angle is generally low, say, on the order of five to twenty degrees, and we shall term it a "grazing" angle of incidence. Paper, wood, formica and painted surfaces all work well; about the only surface that does not work is smooth glass (unless it is covered with fingerprints!). The reason these surfaces work is that they possess a micro texture, which in some cases may not be perceived by the unaided human senses.

Motion detection is accomplished by comparing a newly captured image with a previously captured image to ascertain the direction and amount of movement. One way that may be done is to shift the entire content of one of the images by a distance of one pixel successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" is also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides a raw forward/backward and left/right. The raw movement information may be scaled and or accumulated to provide pointer movement information of a convenient granularity and at a suitable rate of information exchange. The actual algorithms used are described in the incorporated patents and the incorporated application and are refined and sophisticated versions of those described above.

DETAILED DESCRIPTION OF THE PREFERRED EMBODIMENTS

Figure 1:
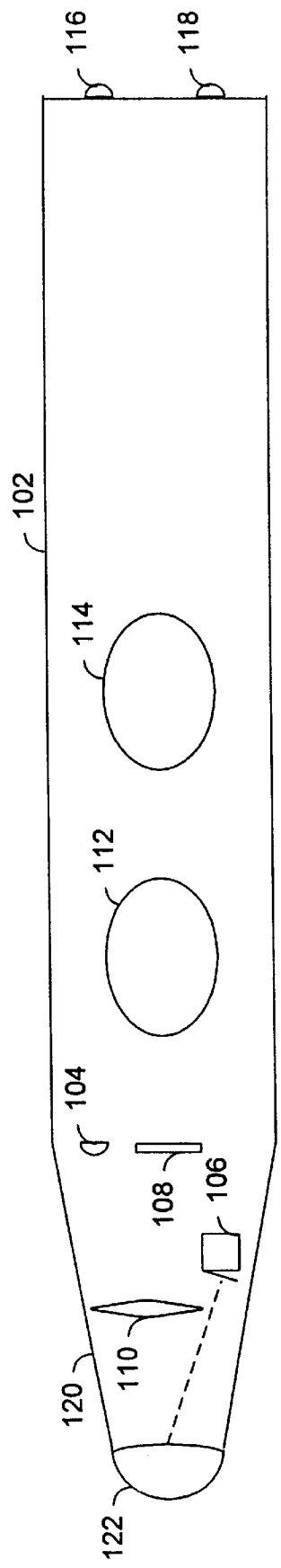
FIG. 1 is an illustration of the major components of a pen-like computer pointing device.

FIG. 1 illustrates the major components of an embodiment of the pen-like computer pointing device. The body 102 of the pointing device is generally cylindrical with a tapering end 120. Buttons 112 and 114 are located on the pointing device where the user may depress and release them. These buttons are coupled to a communications link that sends the state of the buttons back to the computer. In FIG. 1, the communications link is an omnidirectional infrared transceiver shown by light emitting diode 116 and infrared detector 118. A radio frequency, or wired link may also be used for communication between the computer to the pointing device.

The tip 122 or some other portion of the body 102 of the pointing device is translucent. This allows light from the illumination source 104 disposed within the pointing device to exit the pointing device. After light from the illumination source 104 is reflected off the work surface, it re-enters the pointing device through and is focused by lens 110 on optical motion sensor IC 108. Lens 110 and optical motion sensor IC 108 are disposed within the pointing device. The light reflected off the work surface and focused by lens 110 forms an image of the work surface on optical motion sensor IC 108 that is captured by optical motion sensor IC 108. The optical motion sensor IC 108 has an array of photodetectors for capturing the image of the work surface. In the preferred embodiment, these detectors are integrated into the optical motion sensor IC 108. However, these photodetectors could be on a separate integrated circuit. Successive images of the work surface are then compared by optical motion sensor IC 108 to determine the forward/backward, left/right, and rotational motion of the tip of the pointing device.

The relationship between pointing device movements and the display of those movements on the computer screen, such as with a cursor, may be defined by using one of the buttons 112, 114 in combination with motion of the pointing device. For example, to establish a certain direction as being downward on the computer screen, button 114 may be depressed by the user and the pointing device then moved in the direction the user wished to use as a downward stroke. Once this was done once, motion in that direction could stay motion downward on the screen without confusion on the part of the computer, or the user, until the user released the pointing device, or let it rotate within their grasp. Another possibility is to require the user to hold the pointing device with the same rotation every time. For example, the user could hold the pointing device with the buttons away from their body. This would place the buttons roughly underneath the users index finger. If this orientation was used every time, then a motion towards the users body while holding the pointing device in a normal writing position would result in a downward motion as displayed on a computer screen.

The motion of the tip 122 is detected optically by optical motion sensor IC 108 by directly imaging, as an array of pixels, the various particular spatial features of a work surface below the tip, much as human vision is believed to do. In general, this work surface may be almost any flat surface; in particular, the work surface need not be a graphics tablet, or display, special or otherwise. To this end the work surface below the imaging mechanism is illuminated by the aforementioned infrared LED 104. A surprisingly wide variety of surfaces create a rich collection of highlights and shadows when illuminated with a suitable angle of incidence. That angle is generally low, say, on the order of five to twenty degrees, and we shall term it a "grazing" angle of incidence. Paper, wood, formica and painted surfaces all work well; about the only surface that does not work is smooth glass (unless it is covered with fingerprints!). The reason these surfaces work is that they possess a micro texture, which in some cases may not be perceived by the unaided human senses.

The motion of tip 122 is detected by optical motion sensor IC 108 by comparing a newly captured image with a previously captured image to ascertain the direction and amount of movement. The newly captured image and some number of previously captured images may be stored in a memory circuit contained on the optical motion sensor IC 108. That memory may be an analog memory, or the pixel values may be digitized and stored in a digital memory. One way that may be done is to shift the entire content of one of the images by a distance of one pixel successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" is also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides a raw forward/backward and left/right. The raw movement information may be scaled and or accumulated to provide pointer movement information of a convenient granularity and at a suitable rate of information exchange. This process may be accomplished using either analog or digital methods. The image capture and the algorithms used by optical motion sensor IC 108 are described in the incorporated patents and the incorporated application.

The information developed by optical motion sensor IC 108 regarding the motion of the tip of the pointing device is relayed to the computer via the communications link 116. The pointing device also contains some sort of power source. This may be in the form of either rechargeable or non-rechargeable batteries.

The pointing device may also have a switch 106 or other contact detector to determine when the tip 122 is in contact with the work surface. This information may be relayed to the computer via the communications link 116. This information is useful when freehand text and drawings are being entered into the computer. When the tip is not in contact with the work surface, then the computer can be programmed to ignore the motion of the pointing device or take another action appropriate to the situation. For example, when freehand drawing is taking place mimicking the action of a pen, the path of the pointing device should only be recorded when the tip of the pointing device is in contact with the work surface.

Although several embodiments of the invention have been described and illustrated, the invention is not to limited to the specific forms or arrangements of parts so described and illustrated. The invention is limited only by the claims.

What is claimed is:

1. A hand held pointing device for a computer or the like, said pointing device comprising:

a body, said body being generally cylindrical with a tapering end, said tapering end also having a tip;

an illumination source, said illumination source being disposed inside said body and providing light that passes through a translucent portion of said body and illuminates a work surface;

an optical motion detection circuit mounted within the interior of the body and proximate to said translucent portion of said body, the motion detection circuit producing motion indication signals indicative of motion in the directions along a first and a second axes and relative to illuminated imageable features visible through said translucent portion of said body; and wherein the optical motion detection circuit comprises a plurality of photo detectors each having an output, a memory containing a reference frame of digitized photo detector output values and a sample frame of digitized photo detector output values obtained subsequent to the reference frame, and further wherein a plurality of comparison frames, each being a shifted version of the reference frame, is correlated with the sample frame to ascertain motion in the directions along the first and second axes.

2. A device as in claim 1 wherein an existing reference frame is shifted by an amount corresponding to the preceding correlation with a comparison frame.

3. A device as in claim 1 wherein an existing sample frame is periodically taken as a new reference frame.

4. A device as in claim 1, further comprising:

a communications link, said communications link transmitting information representing the motion in the directions along the first and second axes.

5. A device as in claim 4 wherein said communications link is via radio frequency waves.

6. A device as in claim 4 wherein said communications link is via infrared light.

7. A device as in claim 4, further comprising:

a button, said button coupled to said communications link wherein said communications link transmits information representing a state of said button.

* * * * *